United States Patent
Narla

(10) Patent No.: US 9,812,869 B2
(45) Date of Patent: Nov. 7, 2017

(54) RAPID SHUTDOWN AND SAFETY DISCONNECT FOR HYBRID PV SYSTEMS

(71) Applicant: SolarCity Corporation, San Mateo, CA (US)

(72) Inventor: Sandeep Narla, San Jose, CA (US)

(73) Assignee: SolarCity Corporation, San Mateo, CA (US)

(*) Notice: Subject to any disclaimer, the term of this patent is extended or adjusted under 35 U.S.C. 154(b) by 0 days.

(21) Appl. No.: 15/222,785

(22) Filed: Jul. 28, 2016

(65) Prior Publication Data

US 2017/0271875 A1    Sep. 21, 2017

Related U.S. Application Data

(60) Provisional application No. 62/311,372, filed on Mar. 21, 2016.

(51) Int. Cl.
*H02J 3/38* (2006.01)
*H02J 3/46* (2006.01)
(Continued)

(52) U.S. Cl.
CPC ............ *H02J 3/383* (2013.01); *H02J 3/46* (2013.01); *H02S 40/32* (2014.12); *H02S 40/38* (2014.12)

(58) Field of Classification Search
CPC .... H02J 3/383; H02J 3/385; H02J 7/35; H02J 2003/388; Y02E 10/563; Y02E 10/566;
(Continued)

(56) References Cited

U.S. PATENT DOCUMENTS 6,219,623 B1 * 4/2001 Wills ............... H02J 3/383
290/40 B
6,429,546 B1 * 8/2002 Ropp ............... H02J 3/01
307/31
(Continued)

FOREIGN PATENT DOCUMENTS

AU    WO 2014165938 A1 * 10/2014 .............. H02J 3/383
WO    2010/078303 A2    7/2010

*Primary Examiner* — Thienvu Tran
*Assistant Examiner* — David M Stables
(74) *Attorney, Agent, or Firm* — Kilpatrick Townsend & Stockton LLP

(57) ABSTRACT

Embodiments of the present disclosure describe an energy generation system including a rapid shutdown mechanism configured to prevent a flow of power from a photovoltaic (PV) array when activated, a battery pack comprising one or more power storage devices, and an inverter coupled to the rapid shutdown mechanism and the battery pack. The inverter includes anti-islanding relays configured to electrically disconnect the inverter from a utility grid when activated transfer relays configured to electrically disconnect the inverter from a load when activated, and a detection and initiation circuit coupled to the rapid shutdown mechanism, battery pack, anti-islanding relays, and transfer relays, where the detection and initiation circuit is configured to detect a triggering event and to activate the rapid shutdown mechanism, disable the battery pack, activate the anti-islanding relays, and activate the transfer relays in response to the detection of the triggering event.

19 Claims, 8 Drawing Sheets

(51) Int. Cl.
  *H02S 40/38* (2014.01)
  *H02S 40/32* (2014.01)

(58) Field of Classification Search
  CPC . Y02E 10/58; Y02T 10/7005; Y02T 10/7077; Y02T 10/7241; H01L 31/02021; B60L 3/0046; B60L 3/04; B60L 2210/40; Y10T 307/707; H02M 7/44
  See application file for complete search history.

(56) References Cited

U.S. PATENT DOCUMENTS

| | | | |
|---|---|---|---|
| 7,408,268 B1* | 8/2008 | Nocentini | H02J 3/38 307/16 |
| 9,276,410 B2 | 3/2016 | Binder et al. | |
| 2003/0080741 A1* | 5/2003 | LeRow | H02J 3/38 324/320 |
| 2008/0122293 A1* | 5/2008 | Ohm | H02J 3/383 307/86 |
| 2011/0088741 A1* | 4/2011 | Dunton | H01L 31/02021 136/244 |
| 2012/0281444 A1* | 11/2012 | Dent | H02M 1/32 363/56.01 |
| 2013/0058140 A1* | 3/2013 | Victor | H01L 31/02021 363/56.01 |
| 2014/0169053 A1* | 6/2014 | Ilic | H02M 7/53873 363/132 |
| 2014/0191582 A1* | 7/2014 | Deboy | H02J 3/383 307/82 |
| 2014/0306542 A1* | 10/2014 | Williams | H02J 3/385 307/80 |
| 2015/0061409 A1* | 3/2015 | Dunton | H01L 31/02021 307/115 |
| 2016/0036235 A1* | 2/2016 | Getsla | H02J 3/383 307/80 |
| 2016/0072292 A1* | 3/2016 | Rogers | H02J 3/46 307/62 |

* cited by examiner

RAPID SHUTDOWN AND SAFETY DISCONNECT FOR HYBRID PV SYSTEMS

CROSS-REFERENCES TO RELATED APPLICATIONS

This claims priority to U.S. Provisional Application No. 62/311,372, filed on Mar. 21, 2016, which is herein incorporated by reference in its entirety for all purposes.

BACKGROUND

In recent years, climate change concerns, declining panel costs, new financing options, governmental incentives, and other factors have driven a rapid rise in the installation of distributed renewable energy generation (REG) systems (i.e., systems that generate energy using renewable resources such as solar, wind, hydropower, etc.) at residential and non-residential sites. Solar photovoltaic (PV) systems, in particular, have been very popular REG systems.

In response to the increasing market adoption of residential and commercial solar in the United States and elsewhere, and in order to address safety concerns for fire fighters and other first responders who may have to get on the roof of a home or other structure that has PV modules that are actively generating electricity, various national, state and local electric codes have considered adopting requirements for a "rapid shutdown function." Such a function in PV systems is supposed to render the system harmless within a matter of seconds. Although some solutions have been proposed, improvements to the rapid shutdown functionality of PV systems are needed. In addition, the modern PV systems may incorporate battery storage for efficient utilization of PV energy that may also need to be safely operated by the fire fighters and other first responders as they are meant to provide emergency back-up service in case of grid outage.

SUMMARY

Embodiments describe hybrid PV systems configured to perform rapid shutdown functions. Performing the rapid shutdown function is supposed to renders the hybrid PV (PV+storage) system harmless (e.g., lower any voltages to a safe level) so emergency personnel such as fire fighters and other first responders are protected from electric shock.

In some embodiments, an energy generation system includes a first rapid shutdown mechanism configured to prevent a flow of power from a photovoltaic (PV) array when activated, a first battery pack comprising one or more power storage devices, and a first inverter coupled to the first rapid shutdown mechanism and the first battery pack. The first inverter may include first anti-islanding relays configured to electrically disconnect the first inverter from a utility grid when activated, first transfer relays configured to electrically disconnect the first inverter from a load when activated, and a first detection and initiation circuit coupled to the first rapid shutdown mechanism, first battery pack, first anti-islanding relays, and first transfer relays, where the first detection and initiation circuit is configured to detect a triggering event and to activate the first rapid shutdown mechanism, disable the first battery pack, activate the first anti-islanding relays, and activate the first transfer relays in response to the detection of the triggering event, thereby preventing flow of power from the array into an external circuit.

The energy generation system may further include a switch coupled to the first detection and initiation circuit, where the triggering event is associated with an activation of the switch. The switch may be a shut-off switch positioned proximate to a main utility panel. The switch may be a DC disconnect switch positioned inside or proximate to the first inverter. In certain embodiments, the first rapid shutdown mechanism may be further configured to prevent a flow of power from the first battery pack. The first rapid shutdown mechanism may be further configured to prevent a flow of power from all sources of the energy generation system. In some embodiments, the energy generation system may further include a second battery pack including one or more storage devices. The detection and initiation circuit may be further coupled to the second battery pack, and the detection and initiation circuit may be further configured to disable the second battery pack.

The energy generation system may further include a second inverter coupled to a second rapid shutdown mechanism and the second battery pack, the second inverter including: second anti-islanding relays configured to electrically disconnect the second inverter from the utility grid when activated, second transfer relays configured to electrically disconnect the second inverter from the load when activated, and a second detection and initiation circuit coupled to the first detection and initiation circuit, second rapid shutdown mechanism, second battery pack, second anti-islanding relays, and second transfer relays, where the second detection and initiation circuit is configured to activate the second rapid shutdown mechanism, disable the second battery pack, activate the second anti-islanding relays, and activate the second transfer relays in response to a command signal from the first detection and initiation circuit upon the detection of the triggering event. The first inverter may be communicatively coupled to the second inverter. The first detection and initiation circuit may be communicatively coupled to the second detection and initiation circuit. In some embodiments, the energy generation system may further include a third battery pack comprising one or more storage devices coupled to the first inverter. The energy generation system may further include a fourth battery pack comprising one or more storage devices coupled to the second inverter. The first detection and initiation circuit may be further coupled to the second battery pack, and the first detection and initiation circuit may be further configured to disable the second battery pack.

In some embodiments, an energy generation system includes a rapid shutdown mechanism configured to prevent a flow of power from a photovoltaic (PV) array when activated, a battery pack comprising one or more power storage devices, a battery switch coupled to the battery pack, an inverter coupled to the rapid shutdown mechanism and the battery pack, where the switch is configured to electrically disconnect the battery pack from the inverter. The inverter may include anti-islanding relays configured to electrically disconnect the inverter from a utility grid when activated, transfer relays configured to electrically disconnect the inverter from a load when activated, and a detection and initiation circuit coupled to the rapid shutdown mechanism, battery pack, anti-islanding relays, and transfer relays, where the detection and initiation circuit is configured to detect a triggering event and to activate the rapid shutdown mechanism, disable the battery pack, activate the anti-islanding relays, and activate the transfer relays in response to the detection of the triggering event. The energy generation system may also include a shut-off switch coupled to the detection and initiation circuit, and configured to generate the triggering event when the shut-off switch is activated, and a DC disconnect switch coupled to the detection and initiation circuit, and configured to electrically disconnect the PV array and the battery pack when the DC disconnect switch activated.

The shut-off switch may be external to the inverter. The DC disconnect switch may generate the triggering event upon activation.

In some embodiments, a method of performing a rapid shutdown function for an energy generation system includes detecting, by a detection and initiation circuit in an inverter, an occurrence of a triggering event, and in response to the detection of the occurrence of the triggering event, sending, by the detection and the initiation circuit, a plurality of signals to: a rapid shutdown mechanism to cease power flow from a PV array, a battery pack to disable the battery pack, anti-islanding relays to cease power flow from the inverter to a utility grid, and transfer relays to cease power flow from the inverter to a load, where the signals electrically isolate the inverter from the PV array, the battery pack, the utility grid, and the load.

The triggering event may be an activation of a DC disconnect switch. The triggering event may be an activation of an external shut-off switch.

DETAILED DESCRIPTION

In hybrid PV systems, power may flow between two or more power sources and two or more output destinations. In some embodiments, the hybrid PV system includes an inverter that manages the flow of power between the power sources and the output destinations. As an example, an inverter in a hybrid PV system can direct the flow of power from a PV array and a battery to two or more output destinations, such as a utility grid and one or more back-up loads. The back-up loads may be powered by PV and/or a battery when the grid is not available (i.e., off-grid). In one configuration, power may flow from the PV array to the utility grid or back-up loads, where excess power is provided to the battery. In another configuration, power may flow from the battery to the utility grid or the back-up loads, such as when the hybrid PV system is operating at night and the PV panels are not able to generate power. In some embodiments, power may also flow from the utility grid to charge the battery.

Hybrid PV systems may be configured to perform a rapid shutdown function that renders the system safer, thereby preventing electrocution to firemen or other first responders in emergency situations. It may be more complicated to perform the rapid shutdown function for hybrid PV systems than non-hybrid PV systems, given that non-hybrid PV systems have fewer components to disconnect to render the system safe, as will be discussed further herein.

I. Rapid Shutdown for PV Systems

Figure 1:
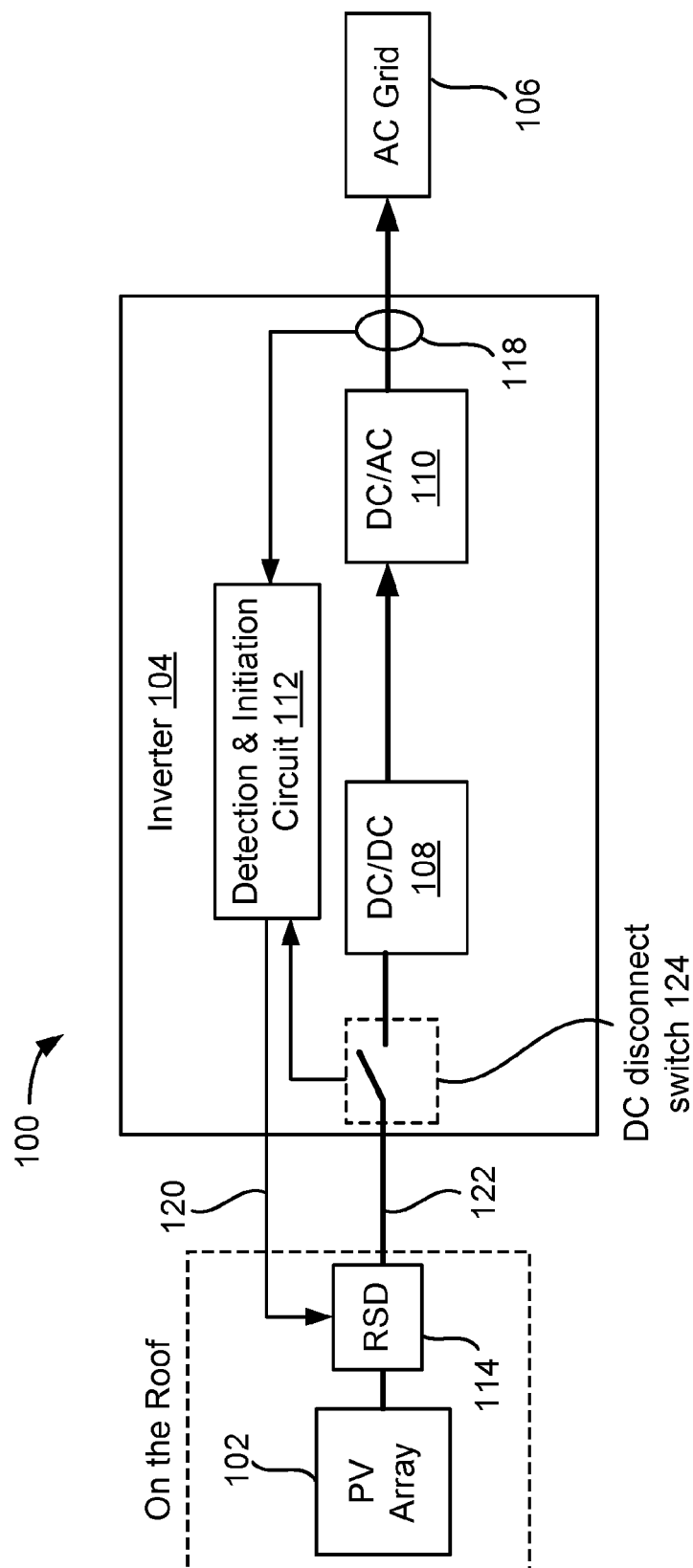
FIG. 1 illustrates a non-hybrid PV system configured to perform a rapid shutdown function.

To better understand the differences between a hybrid PV system and a non-hybrid PV system, it may be helpful to first discuss details of a non-hybrid PV system and subsequently discuss details of a hybrid PV system. FIG. 1 illustrates non-hybrid PV system 100 configured to perform a rapid shutdown function that renders PV system 100 harmless. PV system 100 may include PV array 102 for generating direct current (DC) power and inverter 104 for converting the generated DC power to alternating current (AC) power for outputting to AC grid 106. PV array 102 may be a single PV module or an array/string of PV modules capable of generating DC voltage from photons emitted from a light source such as the sun. Inverter 104 may include DC-to-DC converter 108 for stepping up the received DC power from PV array 102 to a suitable level for inversion, and DC-to-AC converter 110 for converting the DC power to AC power for outputting to AC grid 106. Even though FIG. 1 shows the DC-to-DC converter inside the inverter, there is the possibility that this could be separated from the inverter and be part of the PV array as optimizers or smart modules etc.

Inverter 104 may include a detection and initiation circuit 112 for performing the rapid shutdown function that renders PV system 100 harmless. Detection and initiation circuit 112 may be configured to detect a triggering event, and subsequently initiate the rapid shutdown function in response to the detection of that triggering event to electrically isolate PV array 102 from inverter 104. For instance, detection and initiation circuit 112 may be coupled to sensing circuit 118 for detecting a loss of AC grid voltage 106, e.g., when a fireman has shut off a point of interconnection (POI) of AC grid 106 at the main utility panel. When detection and initiation circuit 112 detects that AC grid voltage 106 is not present, detection and initiation circuit 112 may send a shutoff command via channel 120 to rapid shutdown mechanism 114 to disconnect PV array 102 from inverter 104 so that power no longer flows between PV array 102 and inverter 104, thus preventing output power from being delivered by PV system 100 to power lines 122. Channel 120 may comprise a wired communication line or merely symbolize a wireless communication channel.

Rapid shutdown mechanism 114 may be a device configured to electrically isolate PV array 102 from DC-to-DC converter 108. As an example, in one implementation, rapid shutdown mechanism 114 may consist of a pair of power transistors, e.g., metal oxide semiconductor field effect transistors (MOSFETs), that can electrically disconnect PV array 102 from DC to DC converter 108 upon receiving a shutoff command. Rapid shutdown mechanism 114 may also include a discharge circuit (not shown) for removing any remaining charge in power lines 122 after the pair of power transistors perform electrical disconnection. Details of rapid shutdown mechanism 114 may be referenced in co-pending U.S. patent application Ser. No. 14/681,705, filed on Apr. 8, 2015, entitled "Rapid Shutdown Solid State Circuit for Photovoltaic Energy Generation Systems," the disclosure of which is incorporated by reference in its entirety for all purposes.

In embodiments, detection and initiation circuit 112 may also be configured to detect other triggering events. For instance, detection and initiation circuit 112 may be coupled to DC disconnect switch 124 for detecting a triggering event corresponding to an activation of DC disconnect switch 124. DC disconnect switch 124 may be a conventional DC disconnect switch that is manually activated to open-circuit a power line providing DC power to inverter 104. Detection and initiation circuit 112 may detect when DC disconnect switch 124 has been activated and send the shutoff command to rapid shutdown mechanism 114 for disconnecting PV array 102 from inverter 104 via channel 120. Detection of the activation of DC disconnect switch 124 may be performed by detecting the position of DC disconnect switch 124 or by detecting when a signal continually sent through power lines 122 ceases to be transmitted. In the latter case, detection and initiation circuit 112 may continually send/receive a signal(s) via power-line communication (PLC) when DC disconnect switch 124 is closed. However, when DC disconnect switch 124 is opened, detection and initiation circuit 112 may no longer send/receive the signal and thus determine that DC disconnect switch 124 has been activated.

A non-hybrid PV system (PV system 100) has one input source (PV array 102) and one output destination (AC grid 106). Thus, performing the rapid shutdown function for such systems merely requires isolating PV array 102 from inverter 104. Having more inputs, more output destinations, or even more inverters in the same PV system may increase the complexity of performing the rapid shutdown function. For instance, it may be more difficult to perform the rapid shutdown function for hybrid PV systems, which have more input sources, output destinations, and possibility of more systems, as will be discussed further herein.

II. Rapid Shutdown for Hybrid (PV+Battery) Systems

Figure 2:
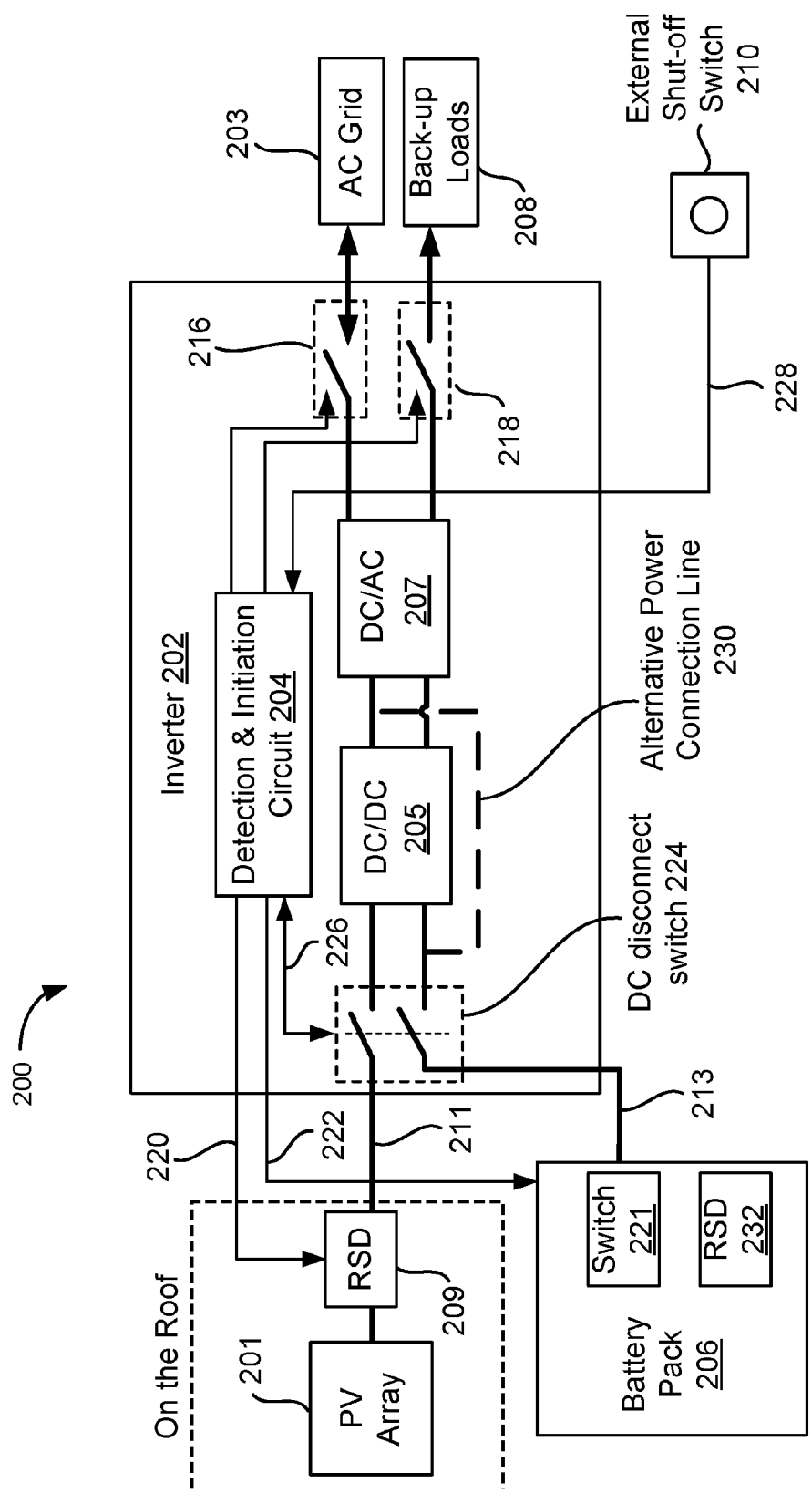
FIG. 2 illustrates an exemplary hybrid PV (PV+storage) system having a rapid shutdown function for performing rapid shutdown on the hybrid PV system, according to embodiments of the present disclosure.

FIG. 2 illustrates hybrid PV system 200 having a rapid shutdown function for rendering the hybrid system harmless, according to embodiments of the present disclosure. Hybrid PV system 200 may include PV array 201 for generating direct current (DC) power and inverter 202 for converting the generated DC power to alternating current (AC) power for outputting to AC grid 203. Similar to inverter 104 in FIG. 1, inverter 202 may include DC-to-DC converter 205 for stepping up the received DC power from PV array 201, and DC to AC converter 207 for converting the DC power to AC power for outputting to AC grid 203.

However, hybrid PV system 200 differs from PV system 100 in that inverter 202 in hybrid PV system 200 may also receive power from battery pack 206 in addition to PV array 202, and output power to back-up loads 208 in voltage-source mode when AC grid 203 is lost during a power outage. Battery pack 206 may be any conventional DC-coupled or AC-coupled battery system containing one or more power storage devices suitable for providing DC power to inverter 202, and back-up loads 208 may be any suitable load, such as a washer/dryer, refrigerator, television set, and the like, suitable for receiving AC power from inverter 202. In some embodiments, battery pack 206 may be coupled to DC-to-DC converter 205 as shown in FIG. 2, or coupled directly between the DC-to-DC converter 205 and DC-to-AC converter 207 via alternative power connection line 230, which is shown as a dotted line. Thus, hybrid PV system 200 has the ability to provide power from PV array 201 and/or battery pack 206 to back-up loads 208 even when power stops flowing to/from AC grid 203. If the rapid shutdown function for PV system 100 is implemented the same way for hybrid PV system 200, the threat of shock may still exist because even with the connection to AC grid 203 is opened, power may still be provided to back-up loads 208, and the power lines operating to provide that power may cause shock. Thus, additional features may be needed to perform the rapid shutdown function for hybrid PV system 200. In some embodiments, battery pack 206 may include battery cells for storing charge, another DC-to-DC converter for converting power to and from the battery cells, and a battery management system (BMS). The DC-to-DC converter in battery pack 206 may be a bi-directional buck and/or boost converter. It is to be appreciated that battery pack 206 may include any sub-combination of these components. For instance, battery pack 206 may only include battery cells and a BMS.

In embodiments, inverter 202 may include detection and initiation circuit 204 that is configured to detect a triggering event, and subsequently initiate a rapid shutdown function in response to the detection of that triggering event to cease power flow between inverter 202 and other components of hybrid PV system 200. For instance, detection and initiation circuit 204 may be coupled to external shut-off switch 210 for receiving a triggering event, such as an activation of external shut-off switch 210. External shut-off switch 210 may be any suitable manual switch, e.g., a mushroom button, capable of transmitting a signal over channel 228 to detection and integration circuit 204 when it is activated, e.g., pressed. The signal sent over channel 228 may be transmitted by simple hardwired signal, PLC, wireless fidelity (WiFi), Bluetooth, radio communication, Modbus, or any other suitable communication technique.

When detection and initiation circuit 204 detects that external shut-off switch 210 has been activated, several commands may be sent to various components of hybrid PV system 200 for stopping power flow to/from inverter 202 to render hybrid PV system 200 substantially incapable of causing shock. As an example, shutoff commands may be sent to anti-islanding relays 216 for electrically disconnecting inverter 202 from AC grid 203, and to back-up transfer relays 218 for electrically disconnecting inverter 202 from back-up loads 208, rapid shutdown mechanism 209 for electrically disconnecting PV array 201 on the roof from inverter 202, and battery pack 206 to disable/turn off battery pack 206 so that power/voltage ceases to be outputted from battery pack 206 to inverter 202. As a result, power cannot flow into inverter 202, nor can power flow out of inverter 202 once switch 210 is pressed, rendering hybrid PV system 200 substantially incapable of causing shock.

Disabling/turning off battery pack 206 can be performed by sending a shutoff signal to battery pack 206 through communication line 222. The shutoff signal may be a kill signal or disruption of continuous signal over the powerlines (power line communication), a separate signal over hard-wired communication (such as RS-485, CAN, RS-232, and the like), WiFi, radio, zigbee, and the like. The shutoff signal may cause battery pack 206 to cease outputting DC power/voltage or activate battery switch 221 coupled to battery pack 206. In some embodiments, battery switch 221 disconnects battery pack 206 from inverter 202 so that power cannot flow from battery pack 206 to inverter 202. Battery switch 221 may be any suitable switch configured to disconnect a power line coupled to battery pack 206, such as one or more power transistors, an electrically controlled relay switch, circuit breakers, electrically-controlled mechanical switches, and the like. Although FIG. 2 illustrates battery switch 221 as being within the structure of battery back 206, embodiments are not so limited. For instance, battery switch 221 may be external to battery pack 206 and positioned along power line 213. Depending on if the battery pack output is a grounded or ungrounded conductor system, the positive or negative (or both positive and negative) power line of the battery pack will be disconnected respectively.

In embodiments, detection and initiation circuit 204 may also be coupled to DC disconnect switch 224 for detecting an activation of DC disconnect switch 224. DC disconnect switch 224 may be an N-pole (multiple pole) single throw (ST) switch that opens all power connections coupled through switch 224 with a single activation of switch 224. As shown in FIG. 2, PV array 201 and battery pack 206 are both coupled to inverter 202 through DC disconnect switch 224, thus DC disconnect switch may be a 4-pole single throw switch, (two power lines for PV array 201 and two power lines for battery pack 206). In some embodiments, the DC disconnect switch may be a multi-pole single throw switch in cases where there are multiple PV strings/arrays or multiple battery packs.

Detection and initiation circuit 204 may detect when DC disconnect switch 224 has been activated and subsequently send shutoff commands to open anti-islanding relays 216, activate open back-up transfer relays 218, initiate rapid shutdown mechanism 209, and disable battery pack 206 for stopping power/voltage flow to/from inverter 202. As already mentioned herein with respect to FIG. 1, detection of the activation of DC disconnect switch 224 may be performed by detecting the position of DC disconnect switch 224 or by detecting when a signal continually sent through power lines 211 ceases to be transmitted. Utilizing the existing power lines to perform PLC communication to detect the activation of DC disconnect switch 224 may reduce the need for extra wires for performing communication functions.

In some embodiments, detection and initiation circuit 204 may also be configured to automatically activate (e.g., open) DC disconnect switch 224 to perform the rapid shutdown function. For example, when detection and initiation circuit 204 detects that external shut-off switch 210 has been activated, a shutoff command 226 may be sent to DC disconnect switch 224 to cease power flow from both PV array 201 and battery pack 206 to inverter 202. Thus, DC disconnect switch 224 may be automatically activated when performing the rapid shutdown function. To enable automatic activation of DC disconnect switch 224, DC disconnect switch 224 may be a remotely controlled N-pole single throw switch, or any other switch capable of being controlled by an electrical activation signal. Accordingly, detection and initiation circuit 204 may activate DC disconnect switch 224 along with sending shutoff commands to the various components of hybrid PV system 200 aforementioned herein to perform the rapid shutdown function.

It should be noted that rapid shutdown mechanism 209 may be any electrically disconnecting mechanism for isolating the PV array after 5 ft/10 ft cross-section of the array to less than 30V, 240 VA within 10 seconds or as required, so as to be in compliance with NEC 2014 690.12 requirements. As an example, rapid shutdown mechanism 209 may be a pair of high power transistors, a relay, or a contactor configured to open the PV array output circuit when shutoff command 220 is received.

Hybrid PV system 200 may also include additional circuits and/or components for performing the rapid shutdown function discussed herein. For instance, discharge circuits may be implemented in hybrid PV system 200 to dissipate any residual voltage/energy once the power ceases to flow to/from inverter 202. In certain embodiments, the discharge circuits may be coupled to power lines 211 and 213 to dissipate any residual voltage in power lines 211 and 213 once rapid shutdown mechanism 209 has been activated and battery pack 206 has been disabled. The discharge circuits may be disposed inside of detection and initiation circuit 204, or at any other suitable location for discharging residual voltage without departing from the spirit and scope of the present disclosure. Similar to the PV rapid shutdown requirements on voltage, power and time, the battery pack, AC grid and back-up load outputs may also be limited to be less than 30V, 240 VA within 10 seconds or as required. In some embodiments, similar to the RSD on the roof for PV array, there could be a RSD inside the battery pack to receive the same RSD signal from the inverter at the same time as PV array. For instance, battery switch 221 in battery pack 206 may include rapid shutdown mechanism (RSD) 232 that receives a shutdown signal to activate battery switch 221 to disconnect battery pack 206 at the same time RSD 209 receives the shutdown signal to disconnect PV array 201. In some embodiments, RSD 232 is a controller that disables the output of battery pack 206 or activates battery switch 221 to disconnect battery pack 206.

Figure 3A:
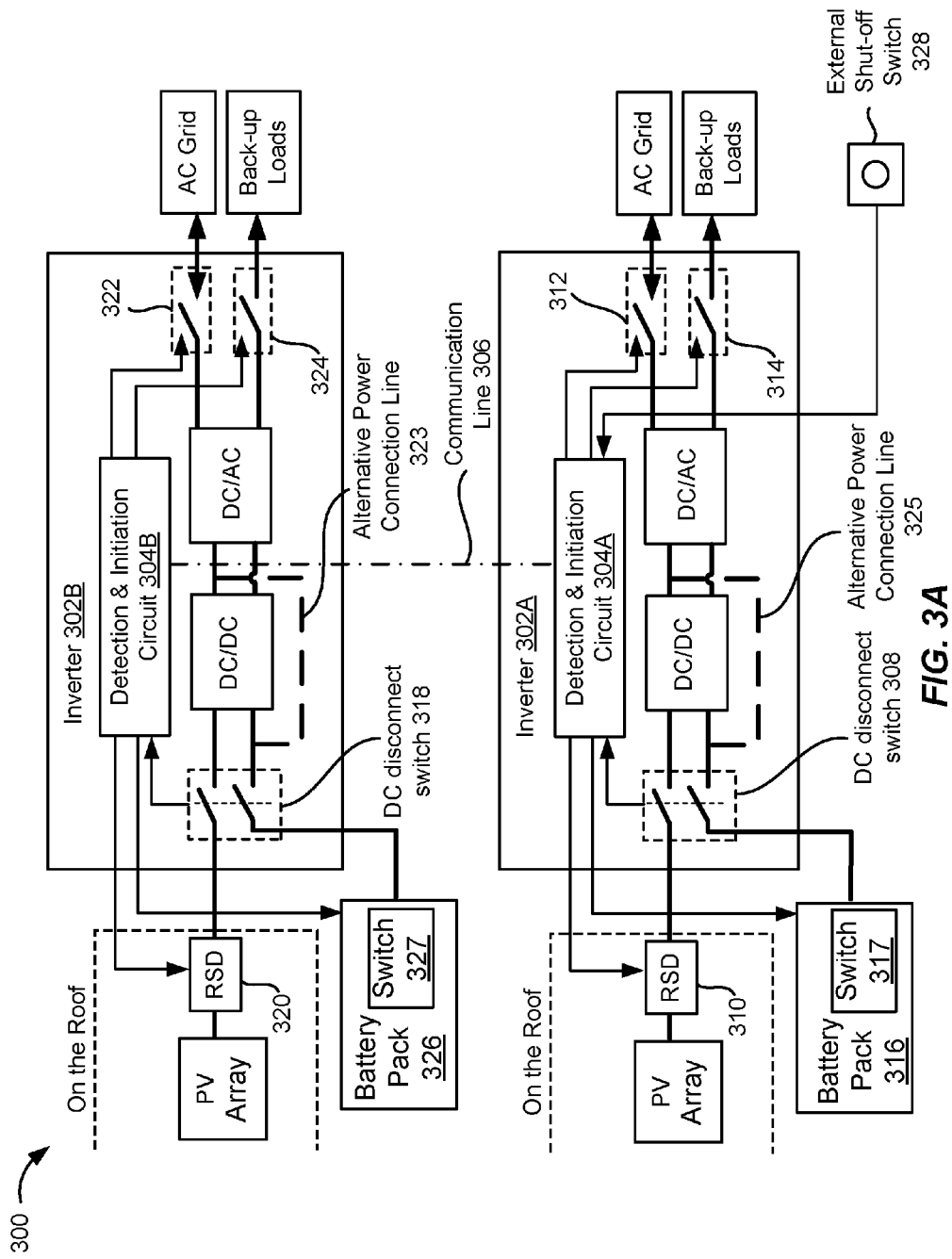
FIG. 3A illustrates an exemplary hybrid PV system having two inverters, each inverter including a detection circuit and initiation circuit, according to embodiments of the present disclosure.

Although FIG. 2 illustrates hybrid PV system 200 as including only one inverter, embodiments are not limited to such configurations. For instance, PV systems having more than one inverter, where each inverter has the ability to perform the rapid shutdown function are envisioned herein as well. Such modifications are within the spirit and scope of the present disclosure. FIG. 3A illustrates exemplary hybrid PV system 300 having two inverters: first inverter 302A and second inverter 302B. First and second inverters 302A and 302B may each include detection and initiation circuits 304A and 304B, respectively.

In embodiments, communication line 306 may be established between both the detection and initiation circuits 304A and 304B. Communication line 306 may be a wired or wireless communication line that allows detection and initiation circuits 304A and 304B to communicate with one another and perform operations together. Thus, if either detection and initiation circuit 304A or 304B detects a triggering event, both detection and initiation circuits 304A and 304B may communication with one another to initiate the rapid shutdown function to cease power flow to/from both inverters 302A and 302B, thereby rendering hybrid PV system 300 safer by reducing the possibility of electrocution to firemen or other first responders in emergency situations. For example, if detection and initiation circuit 304A detects an activation of external shut-off switch 328 or DC disconnect switch 308, detection and initiation circuit 304A may not only commence rapid shutdown by sending shutoff commands to rapid shutdown mechanism 310, anti-islanding relays 312, back-up transfer relays 314, and battery pack 316, but also sending a command to detection and initiation circuit 304B through communication line 306 to commence rapid shutdown, thereby causing detection and initiation circuit 304B to send shutoff commands to rapid shutdown mechanism 320, anti-islanding relays 322, back-up transfer relays 324, and battery pack 326. Battery switches 317 and 327 may electrically disconnect battery packs 316 and 326 from inverters 302A and 302B, respectively, upon receiving the shutoff commands.

Even though FIG. 3A illustrates inverters 302A and 302B as both being hybrid inverters configured to receive DC power from both a PV array and a battery, embodiments are not limited to such configurations. Instead, some embodiments may include at least one inverter that is not a hybrid inverter (e.g., a PV grid-tied inverter or storage inverter) that receives power from either a PV array or a battery respectively, but is still configured to perform the rapid shutdown function according to embodiments of the present disclosure, as shown in FIGS. 3B and 3C.

Figure 3B:
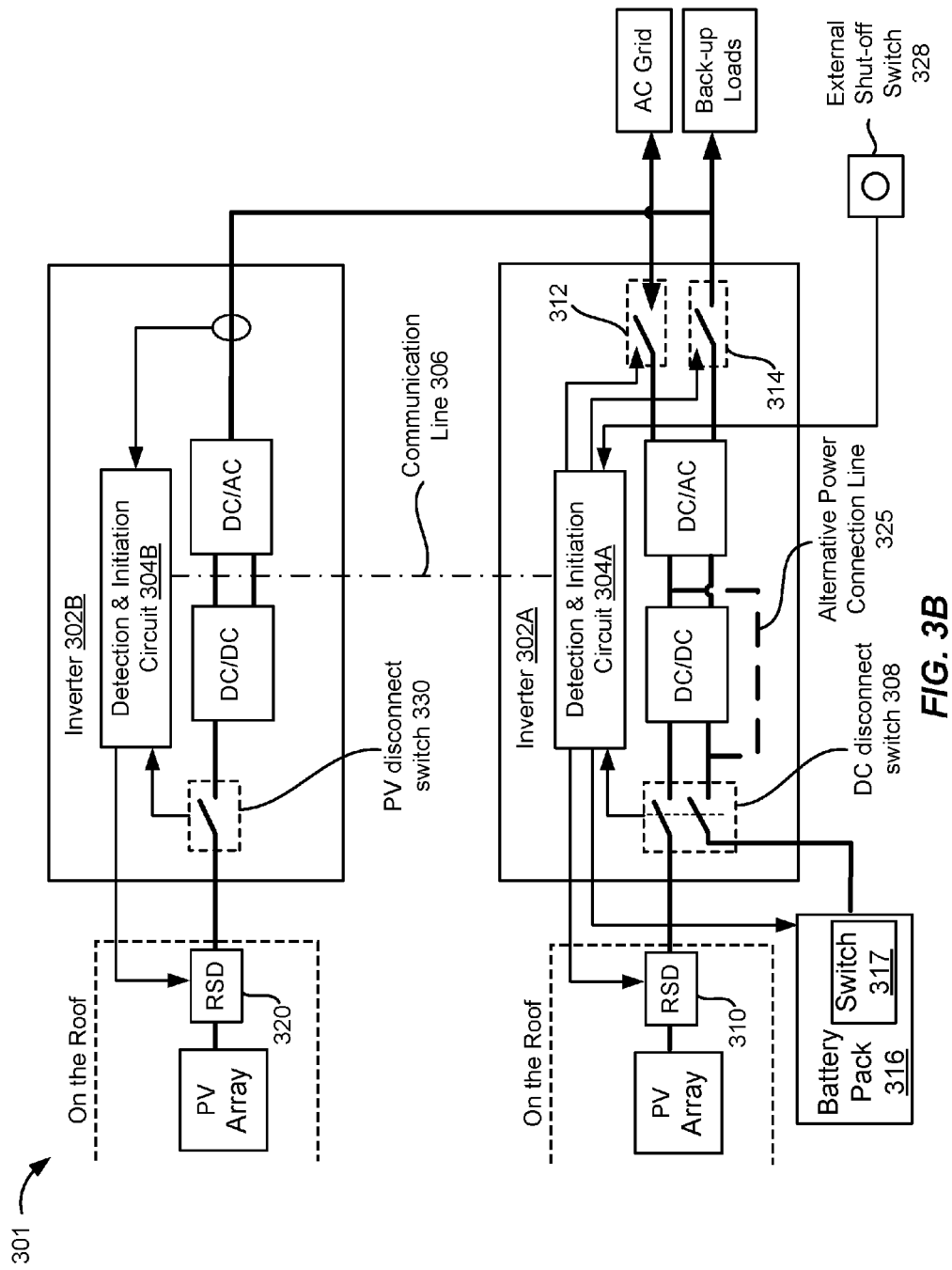
FIG. 3B illustrates an exemplary PV system having two inverters where one inverter is a non-hybrid inverter and a hybrid inverter, where both inverters include a detection and initiation circuit, according to embodiments of the present disclosure.

FIG. 3B illustrates exemplary PV system 301 including first inverter 302A and second inverter 302B where at least one of the inverters is a non-hybrid inverter. In the case shown in FIG. 3B, first inverter 302A is a hybrid inverter and second inverter 302B is a non-hybrid inverter (PV grid-tied inverter). Second inverter 302B may be configured to receive DC power from only a PV array. Communication line 306 may allow detection and initiation circuits 304A and 304B to communicate with one another so that when detection and initiation circuit 304A detects an activation of external shut-off switch 328 or DC disconnect switch 308, detection and initiation circuit 304A may commence rapid shutdown of PV system 301 by sending shutoff commands to not only rapid shutdown mechanism 310, anti-islanding relays 312, back-up transfer relays 314, and battery pack 316, but also sending a command to detection and initiation circuit 304B through communication line 306 to commence rapid shutdown, thereby causing detection and initiation circuit 304B to send a shutoff command to rapid shutdown mechanism 320. Rapid shutdown may also be commenced by second inverter 302B upon an activation of PV disconnect switch 330, which causes detection and initiation circuit 304B to send shutoff signals to rapid shutdown mechanism 320 as well as to detection and initiation circuit 304A.

Figure 3C:
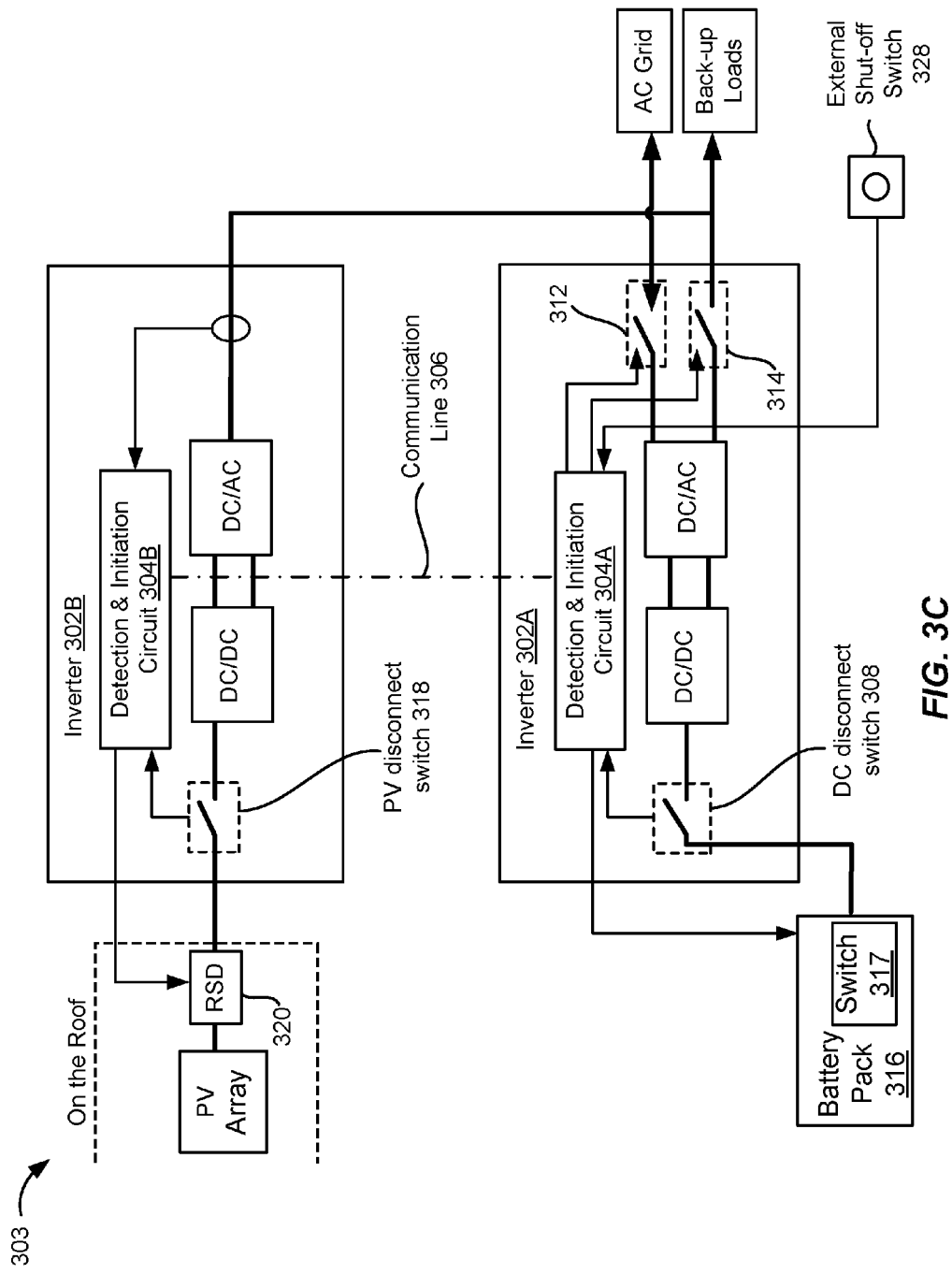
FIG. 3C illustrates an exemplary PV system having two inverters where one inverter is a non-hybrid inverter and one inverter is a storage inverter, where both inverters include a detection and initiation circuit, according to embodiments of the present disclosure.

FIG. 3C illustrates exemplary PV system 303 including first inverter 302A and second inverter 302B where both first inverter 302A and second inverter 302B are non-hybrid inverters. First inverter 302A may be a storage inverter for converting DC power from a storage device, such as battery pack 316; and second inverter 302B may be a PV inverter for converting DC power from a PV array in grid-tied situation. Communication line 306 may allow detection and initiation circuits 304A and 304B to communicate with one another so that when detection and initiation circuit 304A detects an activation of external shut-off switch 328 or DC disconnect switch 308, detection and initiation circuit 304A may commence rapid shutdown of PV system 303 by sending shutoff commands to not only battery pack 316, but also sending a command to detection and initiation circuit 304B through communication line 306 to commence rapid shutdown, thereby causing detection and initiation circuit 304B to send a shutoff command to rapid shutdown mechanism 320. Although only two inverters are discussed with respect to FIGS. 3A-3D, it should be appreciated that any number of inverters may be implemented in a hybrid PV system without departing from the spirit and scope of the present disclosure.

Figure 3D:
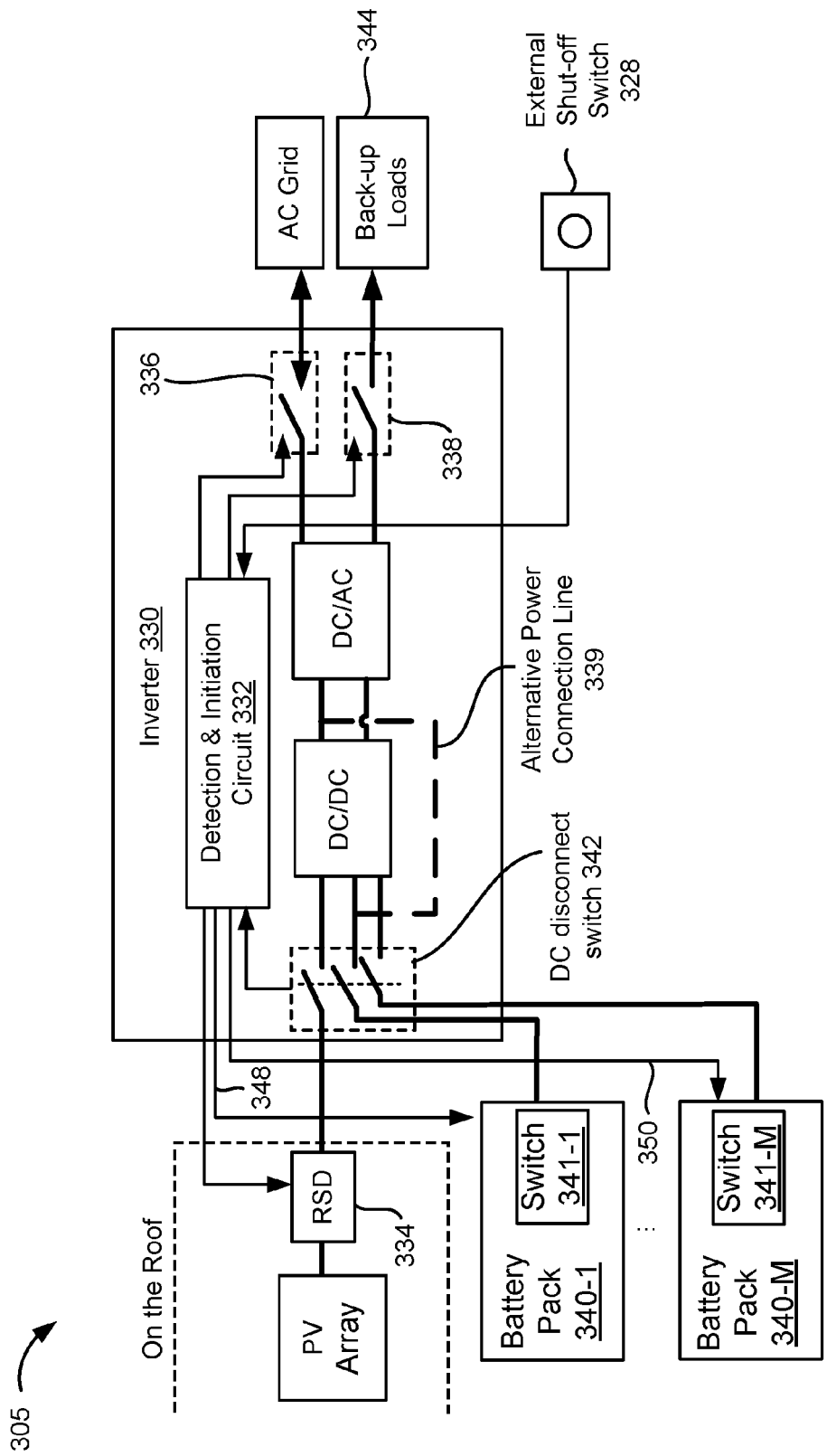
FIG. 3D illustrates an exemplary hybrid PV system having more than one battery pack, according to embodiments of the present disclosure.

In addition to embodiments where hybrid PV system 300 has multiple inverters, other embodiments may have multiple battery packs. FIG. 3D illustrates exemplary hybrid PV system 305 having more than one battery pack. Having multiple battery packs may increase the storage capacity and/or power output of hybrid PV system 305 such that power may be provided to back-up loads 344 for a longer period of time without depleting battery packs 340-1 to 340-M, or to a greater number of back-up loads 344 in case of a grid outage. As shown in FIG. 3D, hybrid PV system 305 may include M battery packs 340-1 to 340-M, where M is an integer representing a number greater than 1. Each battery pack 340-1 to 340-M may be coupled to inverter 330 for providing DC power, and may be coupled to battery switches 341-1 to 341-M for disconnecting battery packs 340-1 to 340-1M from inverter 330. In embodiments, DC disconnect switch 342 may be an N-pole single throw switch suitable to support the number of battery packs 340-1 to 340-M, or sometimes a battery combiner (junction) box could be utilized instead. As an example, if there are two battery packs 340-1 and 340-M (where M is equal to 2), DC disconnect switch 342 may be a six-pole single throw switch (two power lines for PV array 346, two power lines for battery pack 340-1, and two power lines for battery pack 340-M).

In embodiments, detection and initiation circuit 332 may communicate with each battery pack 340-1 to 340-M. As an example, detection and initiation circuit 332 may communicate with battery packs 340-1 through 340-M through separate communication lines, e.g., communication lines 348 and 350, which may be established through wired or wireless connections. In an alternative example, detection and initiation circuit 332 may communicate with battery packs 340-1 and 340-M through respective power lines by power line communication (PLC). It is to be appreciated that any other suitable communication technique may be implemented to enable communication between detection and initiation circuit 332 and battery packs 340-1 through 340-M. Communication lines 348 and 350 allow detection and initiation circuit 332 to send shutoff commands to all of battery packs 340-1 through 340-M during performance of the rapid shutdown function to cease power flow from/to battery packs 340-1 through 340-M to/from inverter 330 respectively. The PLC signal could be a signal continuously sent to the battery that could be interrupted by the opening of the DC disconnect and reinstated by the closing of the DC disconnect, or it could be just a kill signal for shutting off the battery.

Although FIG. 3D illustrates hybrid PV system 305 as having only one inverter coupled to multiple battery packs, other embodiments having multiple inverters where each inverter is coupled to multiple battery packs are envisioned herein. As mentioned herein with respect to FIGS. 3A-3C, the inverters in multiple-inverter hybrid PV systems may have detection and initiation circuits that communicate with one another to perform the rapid shutdown function for the entire hybrid PV system. In some embodiments, first inverter 302A may only include detection and initiation circuit 304A while other inverters, e.g., second inverter 302B, may only receive the shut-off command from first inverter 302A to perform the rapid shutdown mechanism on all components connected to second inverter 302B.

Figure 4:
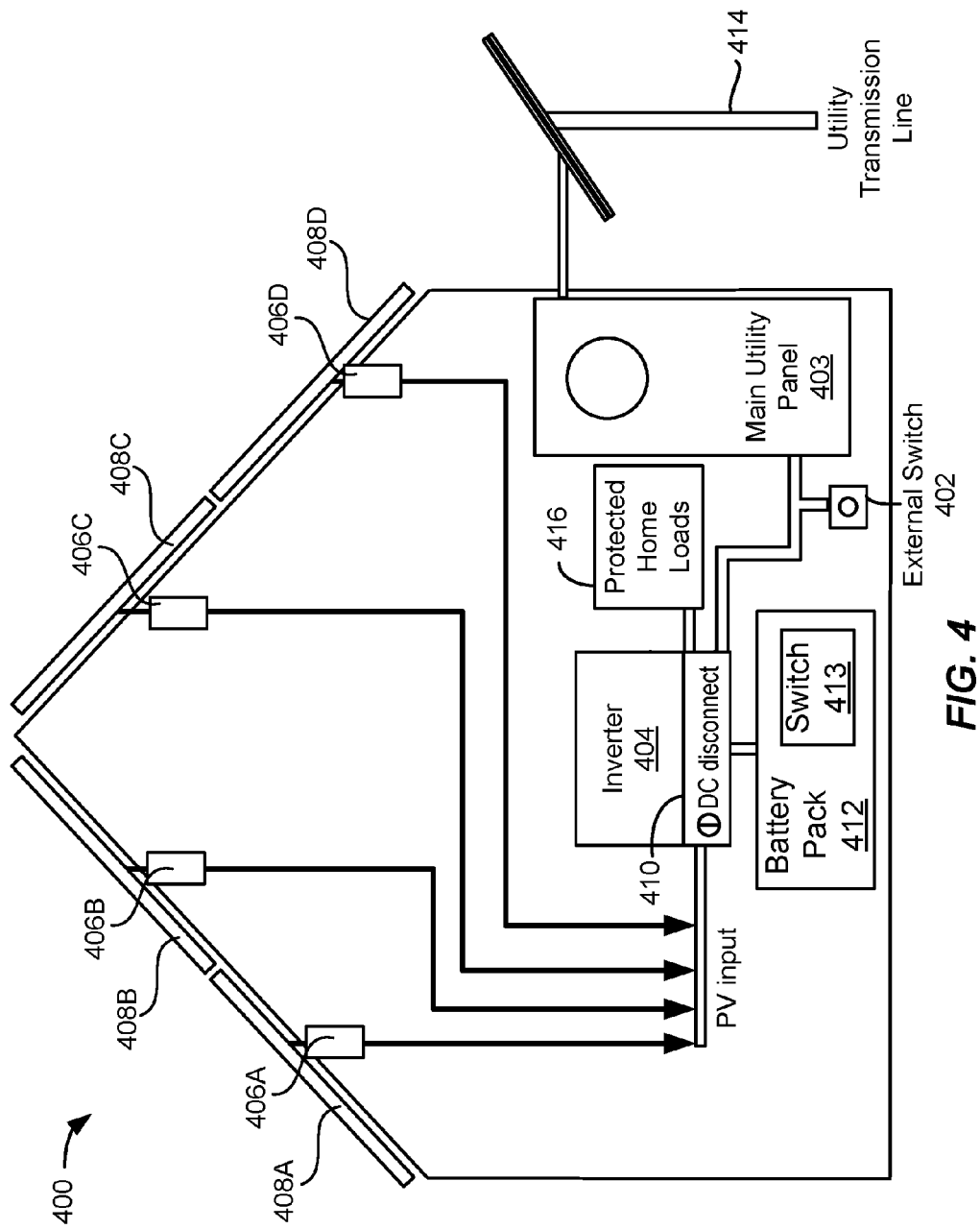
FIG. 4 is a simplified diagram illustrating an implementation of a hybrid PV system at an installation site, according to embodiments of the present disclosure.

In some embodiments, one external shut-off switch 328 may be implemented in hybrid PV system 300. Having more than one external shut-off switch 328 may be redundant and unnecessary as long as external shut-off switch 328 is positioned in an easily accessible location, although having more than one external shut-off switch 328 is certainly possible without departing from the spirit and scope of the present disclosure. Positioning external shut-off switch 328 in an accessible location enables initiation of the rapid shutdown function of hybrid PV system 300 even if inverters 302A and 302B are located in inaccessible or difficult to access locations. One exemplary location for external shut-off switch 328 is close to a main utility electrical panel of a house as shown in FIG. 4. In some embodiments, external shut-off switch 328 may be located on, or in close proximity to, each inverter.

FIG. 4 is a simplified diagram illustrating an implementation of hybrid PV system 400 at an installation site, according to embodiments of the present disclosure. External shut-off switch 402 may be positioned proximate to main utility panel 403, which is typically positioned at a location that is easily accessible to utility technicians or other personnel for gauging power usage from the utility grid provided by utility transmission line 414. Positioning switch 402 close to main utility panel 403 also ensures that switch 402 is easily accessible. Thus, the rapid shutdown function of hybrid PV system 400 may be easily initiated from outside the home. Pressing switch 402 may initiate the rapid shutdown function and cause inverter 404 to: (1) send a shutoff command to rapid shutdown mechanisms 406A-406D to cease power flow from PV arrays 408A-408D to inverter 404, (2) send a shutoff command to a back-up transfer relays (not shown but inside the inverter) to cease power flow from inverter 404 to protected home loads 416, (3) send a shutoff command to an anti-islanding relays (not shown but inside the inverter) to cease power flow from inverter 404 to/from main utility panel (AC grid) 404, and (4) send a shutoff command to battery pack 412 to cease output of DC power/voltage to inverter 404, thereby rendering hybrid PV system 400 substantially incapable of causing shock.

In some embodiments, the external shut-off switch 402 may not be needed in hybrid PV system 400. For example, if inverter 404 is positioned proximate to main utility panel 403 such that inverter 404 is easily accessible, then DC disconnect switch 410 may also be positioned in a location that is easily accessible since DC disconnect switch 410 is attached to, or constructed as a part of, inverter 404. Thus, a person would only need to activate DC disconnect switch 410 to initiate the rapid shutdown function of hybrid PV system 400, and having an external shut-off switch 402 proximate to main utility panel 403 would be redundant and unnecessary.

Figure 5:
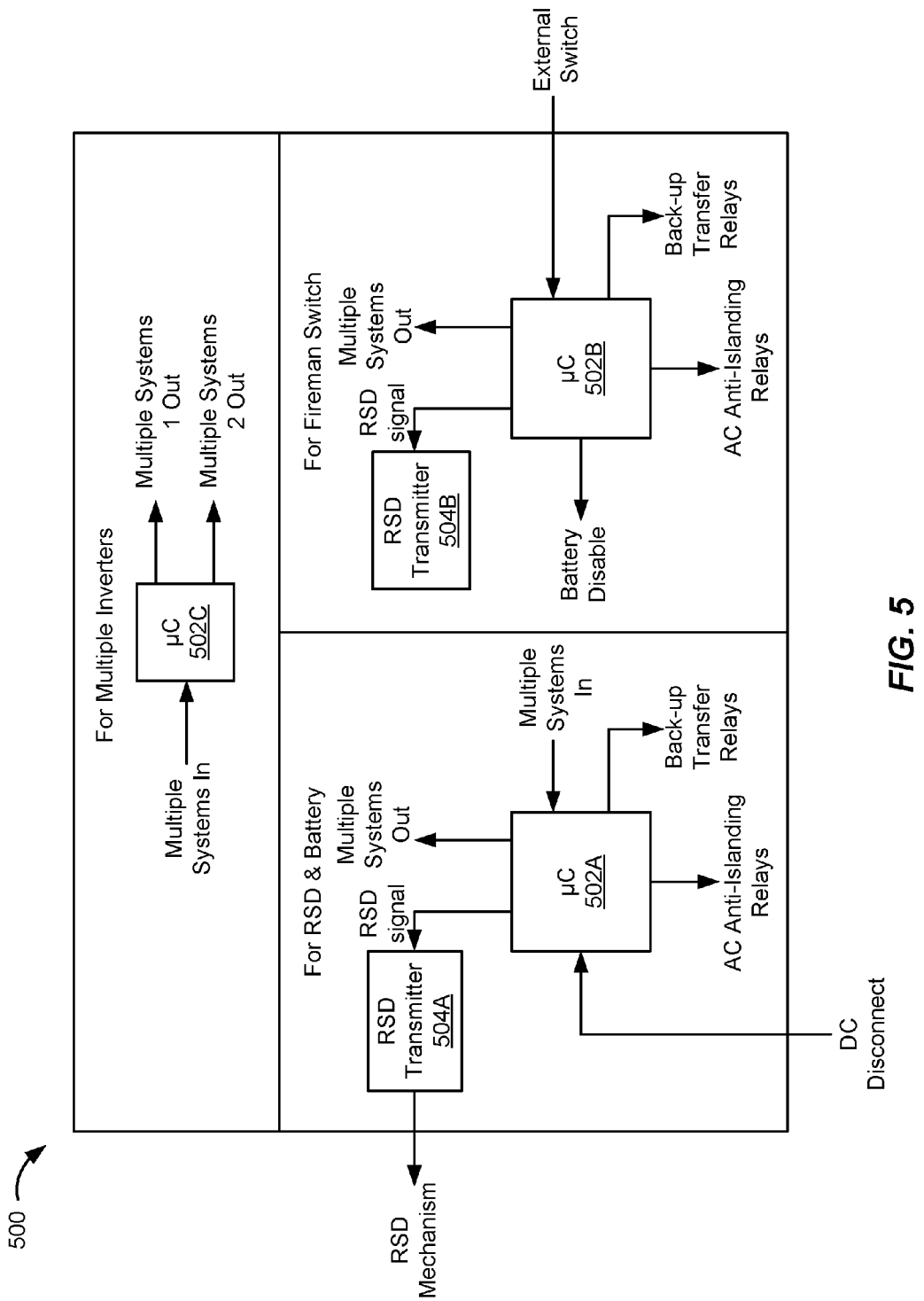
FIG. 5 is a simplified block diagram illustrating details of a detection and initiation circuit, according to embodiments of the present disclosure.

FIG. 5 is a simplified block diagram illustrating details of detection and initiation circuit 500, according to embodiments of the present disclosure. Detection and initiation circuit 500 may be similar to detection and initiation circuits 204, 304A, and 304B, as discussed herein with respect to FIGS. 2 and 3, for detecting a triggering event and initiating a rapid shutdown function to prevent electrical shocking by a PV system in response to detection of the triggering event. In embodiments, detection and initiation circuit 500 may include one or more microcontrollers 502A-502C for performing the rapid shutdown function of a hybrid PV system according to embodiments of the present disclosure.

Microcontroller 502A may be configured to perform a rapid shutdown function according to embodiments of the present disclosure by having pins that are able to send and receive signals to and from multiple inverter systems, send signals to back-up transfer relays for electrically disconnecting an inverter from back-up load(s), send signals to AC anti-islanding relays for electrically disconnecting an inverter from an AC grid, send signals to a rapid shutdown transmitter 504A for communicating with a rapid shutdown mechanism to electrically disconnect a PV array from an inverter, send shutoff commands to a battery pack to cease output of DC power/voltage to an inverter and receive signals to detect a position of a DC disconnect switch. Microcontroller 502A may detect when the DC disconnect switch has been activated and initiate the rapid shutdown function as discussed herein.

Microcontroller 502B may be configured to perform a rapid shutdown function according to embodiments of the present disclosure by having pins that are able to send signals to multiple inverter systems, send signals to back-up transfer relays for electrically disconnecting an inverter from back-up load(s), send signals to AC anti-islanding relays for electrically disconnecting an inverter from an AC grid, send signals to rapid shutdown transmitter 504A for communicating with a rapid shutdown mechanism to electrically disconnect a PV array from an inverter, and send shutoff commands to a battery pack to cease output of DC power to an inverter. Microcontroller 502B may detect when the external shut-off switch has been activated and initiate the rapid shutdown function as discussed herein.

Microcontroller 502C may be configured to communicate between other detection and integration circuits by having pins that are able to send and receive signals to and from other systems.

Although FIG. 5 illustrates detection and integration circuit 500 as only having three microcontrollers, embodiments are not so limited. Other detection and integration circuits may have more or less than three microcontrollers to perform a rapid shutdown function without departing from the spirit and scope of the present disclosure. For example, all the above-discussed functionalities from three microcontrollers can be performed by one microcontroller.

Although the disclosure has been described with respect to specific embodiments, it will be appreciated that the disclosure is intended to cover all modifications and equivalents within the scope of the following claims.

What is claimed is:

1. An energy generation system comprising:
   a first rapid shutdown mechanism configured to prevent a flow of power from a photovoltaic (PV) array when activated;
   a first battery pack comprising one or more power storage devices;
   a switch; and
   a first inverter coupled to the first rapid shutdown mechanism, the switch, and the first battery pack, the first inverter comprising:
   first anti-islanding relays configured to electrically disconnect the first inverter from a utility grid when activated;
   first transfer relays configured to electrically disconnect the first inverter from a load when activated; and
   a first detection and initiation circuit coupled to the first rapid shutdown mechanism, first battery pack, first anti-islanding relays, and first transfer relays, wherein the first detection and initiation circuit is configured to detect an activation of the switch and to activate the first rapid shutdown mechanism, disable the first battery pack, activate the first anti-islanding relays, and activate the first transfer relays in response to the detection of the activation of the switch, thereby preventing flow of power from the array into an external circuit in response to the detection of the activation of the switch.

2. The energy generation system of claim 1, wherein the switch is a shut-off switch positioned proximate to a main utility panel.

3. The energy generation system of claim 1, wherein the switch is a DC disconnect switch positioned inside or proximate to the first inverter.

4. The energy generation system of claim 1, wherein the first rapid shutdown mechanism is further configured to prevent a flow of power from the first battery pack.

5. The energy generation system of claim 4, wherein the first rapid shutdown mechanism is further configured to prevent a flow of power from all sources of the energy generation system.

6. The energy generation system of claim 1, further comprising a second battery pack comprising one or more storage devices.

7. The energy generation system of claim 6, wherein the detection and initiation circuit is further coupled to the second battery pack, and wherein the detection and initiation circuit is further configured to disable the second battery pack.

8. The energy generation system of claim 6, further comprising a second inverter coupled to a second rapid shutdown mechanism and the second battery pack, the second inverter comprising:
   second anti-islanding relays configured to electrically disconnect the second inverter from the utility grid when activated;
   second transfer relays configured to electrically disconnect the second inverter from the load when activated; and
   a second detection and initiation circuit coupled to the first detection and initiation circuit, second rapid shutdown mechanism, second battery pack, second anti-islanding relays, and second transfer relays, wherein the second detection and initiation circuit is configured to activate the second rapid shutdown mechanism, disable the second battery pack, activate the second anti-islanding relays, and activate the second transfer relays in response to a command signal from the first detection and initiation circuit upon the detection of the activation of the switch.

9. The energy generation system of claim 8, wherein the first inverter is communicatively coupled to the second inverter.

10. The energy generation system of claim 9, wherein the first detection and initiation circuit is communicatively coupled to the second detection and initiation circuit.

11. The energy generation system of claim 8, further comprising a third battery pack comprising one or more storage devices coupled to the first inverter.

12. The energy generation system of claim 11, further comprising a fourth battery pack comprising one or more storage devices coupled to the second inverter.

13. The energy generation system of claim 8, wherein the first detection and initiation circuit is further coupled to the second battery pack, and wherein the first detection and initiation circuit is further configured to disable the second battery pack.

14. An energy generation system comprising:
   a rapid shutdown mechanism configured to prevent a flow of power from a photovoltaic (PV) array when activated;
   a battery pack comprising one or more power storage devices;
   a battery switch coupled to the battery pack;
   a shut-off switch;
   an inverter coupled to the rapid shutdown mechanism, the shut-off switch, and the battery pack, wherein the switch is configured to electrically disconnect the battery pack from the inverter, the inverter comprising:
      anti-islanding relays configured to electrically disconnect the inverter from a utility grid when activated;
      transfer relays configured to electrically disconnect the inverter from a load when activated; and
      a detection and initiation circuit coupled to the rapid shutdown mechanism, battery pack, anti-islanding relays, and transfer relays, wherein the detection and initiation circuit is configured to detect an activation of the shut-off switch and to activate the rapid shutdown mechanism, disable the battery pack, activate the anti-islanding relays, and activate the transfer relays in response to the detection of the activation of the shut-off switch; and
   a DC disconnect switch coupled to the detection and initiation circuit, and configured to electrically disconnect the PV array and the battery pack when the DC disconnect switch activated.

15. The energy generation system of claim 14, wherein the shut-off switch is external to the inverter.

16. The energy generation system of claim 15, wherein the DC disconnect switch generates the triggering event upon activation.

17. A method of performing a rapid shutdown function for an energy generation system comprising:
   detecting, by a detection and initiation circuit in an inverter, an occurrence of an activation of a switch; and
   in response to the detection of the occurrence of the activation of the switch, sending, by the detection and the initiation circuit, a plurality of signals to:
      a rapid shutdown mechanism to cease power flow from a PV array;
      a battery pack to disable the battery pack;
      anti-islanding relays to cease power flow from the inverter to a utility grid; and
      transfer relays to cease power flow from the inverter to a load,
   wherein the signals electrically isolate the inverter from the PV array, the battery pack, the utility grid, and the load.

18. The method of claim 17, wherein the triggering event is an activation of a DC disconnect switch.

19. The method of claim 17, wherein the triggering event is an activation of an external shut-off switch.

* * * * *